United States Patent
Chung et al.

(10) Patent No.: US 8,450,887 B2
(45) Date of Patent: May 28, 2013

(54) VERTICAL VIBRATOR

(75) Inventors: Seuk Hwan Chung, Gyunggi-do (KR); Joon Choi, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 112 days.

(21) Appl. No.: 12/929,576

(22) Filed: Feb. 1, 2011

(65) Prior Publication Data

US 2011/0193426 A1  Aug. 11, 2011

(30) Foreign Application Priority Data

Feb. 8, 2010 (KR) .................. 10-2010-0011581

(51) Int. Cl.
*H02K 33/00* (2006.01)
(52) U.S. Cl.
USPC .................. 310/25; 310/27; 310/81
(58) Field of Classification Search
USPC .............. 310/27, 36, 14, 81, 25; 381/152, 381/396; 29/596–698
See application file for complete search history.

(56) References Cited

U.S. PATENT DOCUMENTS

| | | |
|---|---|---|
| 5,602,432 A | 2/1997 | Mizutani |
| 5,861,686 A * | 1/1999 | Lee .................... 310/36 |
| 2005/0285454 A1 * | 12/2005 | Choi et al. .......... 310/14 |
| 2006/0002577 A1 | 1/2006 | Won et al. |
| 2009/0121559 A1 | 5/2009 | Lee |

FOREIGN PATENT DOCUMENTS

| | | |
|---|---|---|
| CN | 2342532 | 10/1999 |
| CN | 2836331 | 11/2006 |
| CN | 101436812 | 5/2009 |
| KR | 2001-0044187 | 6/2001 |
| KR | 10-0541112 | 12/2005 |
| KR | 10-2006-0046360 | 5/2006 |
| KR | 10-2010-0117896 | 11/2010 |

OTHER PUBLICATIONS

Korean Office Action issued Apr. 20, 2011 in corresponding Korean Patent Application 10-2010-0011581.
Chinese Office Action issued Feb. 4, 2013 for corresponding Chinese Application No. 201110035622.4.

* cited by examiner

*Primary Examiner* — Tran N. Nguyen
*Assistant Examiner* — Leda Pham (57) ABSTRACT

There is provided a vertical vibrator according to an exemplary embodiment of the present invention. The vertical vibrator may include: a casing having an inner space of a predetermined size formed therein and a step portion protruded to be stepped from an upper edge thereof; a magnetic unit including a yoke disposed in the inner space of the casing and a magnet fixed by being magnetized on a closed inner surface of the yoke in a vertical direction; an elastic member including an outer ground portion fixed to the step portion and an inner ground portion fixed to the magnetic unit; and a coil for generating vibrations disposed on the lower portion of the magnetic unit and generating electromagnetic force by interaction with the magnetic unit when power is applied thereto.

8 Claims, 8 Drawing Sheets

VERTICAL VIBRATOR

CROSS-REFERENCE TO RELATED APPLICATIONS

This application claims the priority of Korean Patent Application No. 10-2010-0011581 filed on Feb. 8, 2010, in the Korean Intellectual Property Office, the disclosure of which is incorporated herein by reference.

BACKGROUND OF THE INVENTION

1. Field of the Invention

The present invention relates to a vertical vibrator, and more particularly, to a vertical vibrator capable of preventing vibration in a horizontal direction and reinforcing the cohesive power of a magnetic fluid.

2. Description of the Related Art

Recently, a release of personal digital assistants having large LCD screens has been rapidly increased for the convenience of users. Therefore, personal digital assistants have adopted a touch screen scheme and used a vibration motor in order to generate vibrations when the screen is touched.

The vibration motor is a part using the principle of generating electromagnetic force to convert electric energy into mechanical vibrations. The vibration motor, which is mounted in personal digital assistants, has also been used to inform a user of an incoming telephone call in silence.

The related art has used a scheme of generating a rotatory force to rotate a rotating unit having an unbalanced mass, thereby obtaining a mechanical vibration. That is, the related art has used a scheme of obtaining mechanical vibrations by performing a rectifying action on the rotatory force through a contact between a brush and a commutator.

However, the brush type structure using the commutator leads to mechanical friction, electrical sparks and foreign materials, while the brush passes through a segment of the commutator and a gap between poles of the segment when the motor rotates, thereby shortening the lifespan of the motor.

In addition, when voltage is applied to the motor, it takes time to reach targeted vibrations due to rotational inertia, such that it is difficult to rapidly implement appropriate vibrations on the touch screen.

In order to overcome the disadvantages of the lifespan and the response characteristics of the motor and implement the vibration function of the touch screen, a vertical vibrator has mainly been used.

The vertical vibrator does not generate vibrations by using the rotational principle of the motor, but generates resonance by periodically generating electromagnetic force obtained through a spring mounted in the vibration motor and a mass body hung on the spring according to a resonance frequency to generate vibrations.

In this case, the vertical vibrator mainly uses a yoke having a magnet attached to a cylindrical casing to generate vibration in a vertical direction. However, as the operation of the vertical direction becomes greater, there is a problem in that the vertical vibrator moves the mass body in the horizontal direction as well as the vertical direction.

Since the vertical vibrator uses the cylindrical casing, an elastic member provided to generate the vibrations is combined with a bending spring or a plate spring including a spaced ring, such that it is difficult to make the size of the vertical vibrator small.

Further, the magnetic fluid serving as a cushion is away from the magnet, thereby weakening adsorptive power.

Therefore, as the adsorptive power of the magnetic fluid is weakened, the force of fixing the magnetic fluid to the magnet is also weakened, such that when the vibrator is vibrated up and down, it is in direct contact with the upper structure, thereby causing touch tone and noises.

SUMMARY OF THE INVENTION

An aspect of the present invention provides a vertical vibrator capable of preventing touch tone and noises from being generated when a vibrating unit is vibrated up and down by preventing a horizontal motion of a mass body and reinforcing a cohesive power of magnetic fluid.

According to an aspect of the present invention, there is provided a vertical vibrator, including: a casing having an inner space of a predetermined size formed therein and a step portion protruded to be stepped from an upper edge thereof; a magnetic unit including a yoke disposed in the inner space of the casing and a magnet fixed by being magnetized on an closed inner surface of the yoke in a vertical direction; an elastic member including an outside ground portion fixed to the step portion and an inside ground portion fixed to the magnetic unit; and a coil for generating vibrations disposed on the lower portion of the magnetic unit and generating electromagnetic force by interaction with the magnetic unit when power is applied.

The step portion may include a horizontal portion seated in the outside ground portion and a vertical portion providing a vibration space for the elastic member.

The horizontal portion may be formed by making the inner diameter of the upper portion of the casing smaller than the inner diameter of the lower portion thereof based on the horizontal portion.

The elastic member may be a plate spring or a bending spring including at least one elastic leg connected to the outside ground portion and the inside ground portion to generate an elastic force.

The elastic leg may extend in a spiral direction.

According to another exemplary embodiment of the present invention, there is provided a vertical vibrator, including: a casing having an inner space of a predetermined size formed therein and a step portion protruded to be stepped from an upper edge thereof; a magnetic unit including a yoke disposed in the inner space of the casing and a magnet fixed by being magnetized on an closed inner surface of the yoke in a vertical direction; an elastic member including an outside ground portion fixed to the step portion and an inside ground portion fixed to the magnetic unit; a coil for generating vibrations disposed on the lower portion of the magnetic unit and generating electromagnetic force by interaction with the magnetic unit when power is applied; and a magnetic fluid applied to the inside ground portion to be fixed by magnetic flux leaked from the magnet.

The step portion may include a horizontal portion seated in the outside ground portion and a vertical portion providing a vibration space for the elastic member.

The horizontal portion may be formed by making the inner diameter of the upper portion of the casing smaller than the inner diameter of the lower portion thereof based on the horizontal portion.

The inside ground portion of the elastic member may be formed with at least one fluid insertion hole.

The magnetic fluid may be inserted into the fluid insertion hole by being applied thereto.

The casing may be formed with at least one injecting hole to penetrate therethrough in order to inject the magnetic fluid.

The injecting hole may have a size of an inner diameter smaller than an outer diameter of the magnet.

The elastic member may be a plate spring or a bending spring including at least one elastic leg connected to the outer ground portion and the inner ground portion to generate an elastic force.

The elastic leg may extend in a spiral direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, and those are to be construed as being included in the spirit of the present invention.

Further, throughout the drawings, the same or similar reference numerals will be used to designate the same components or like components having the same functions in the scope of the similar idea.

Figure 1:
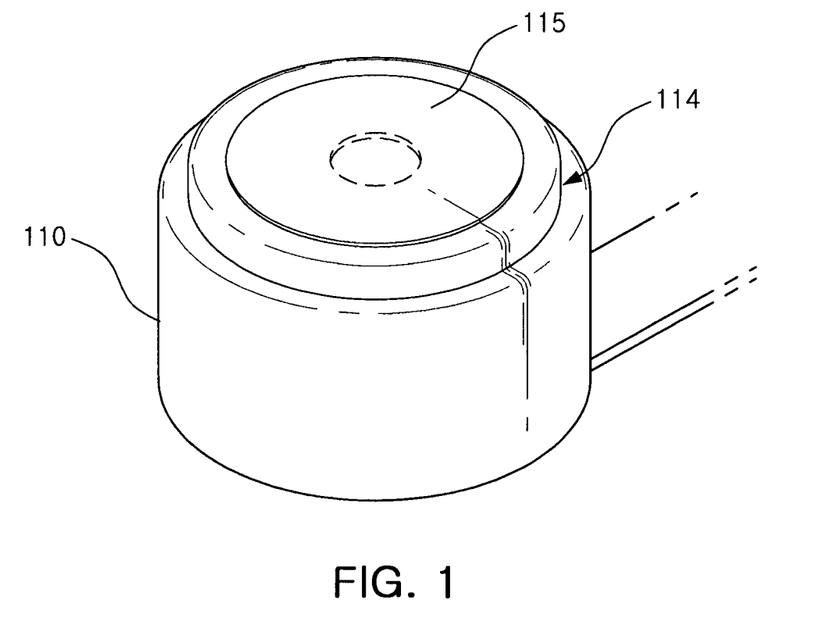
FIG. 1 is a perspective view schematically showing an appearance of a vertical vibrator according to an exemplary embodiment of the present invention.
Figure 2:
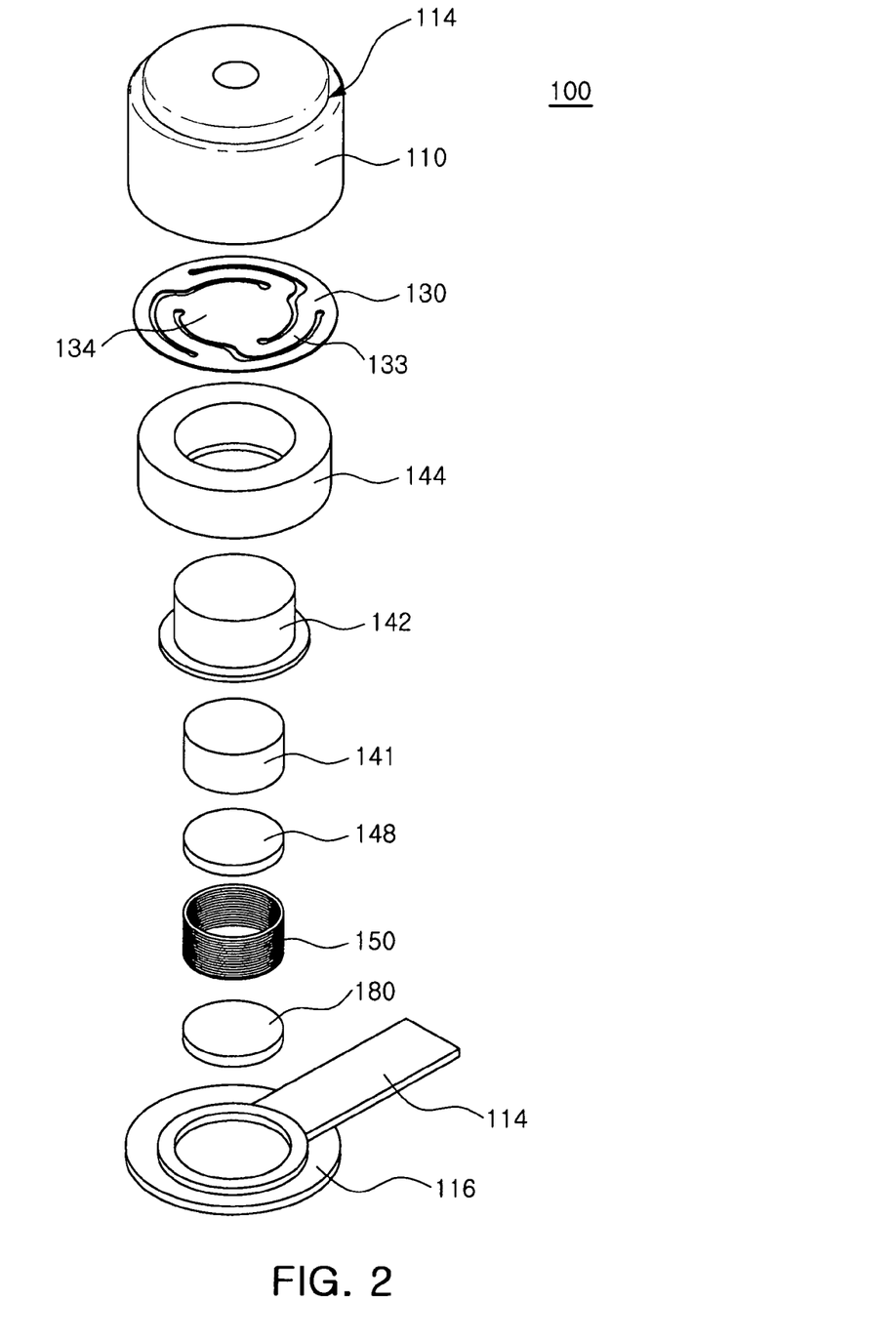
FIG. 2 is an exploded perspective view schematically showing the vertical vibrator according to the exemplary embodiment of the present invention.
Figure 3:
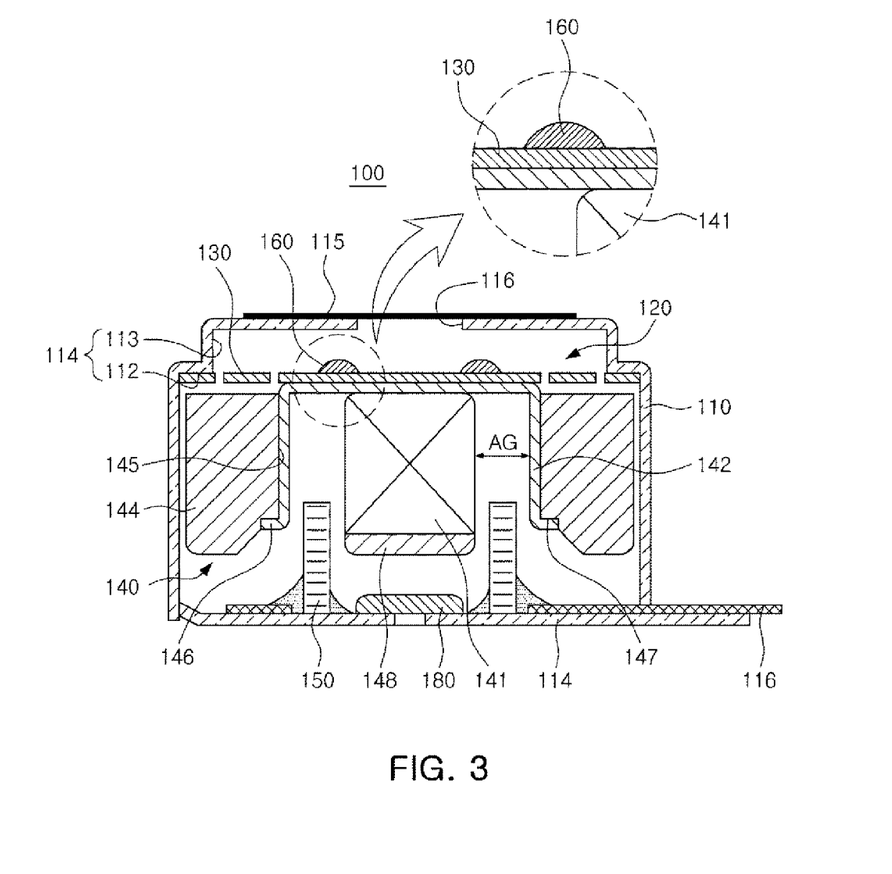
FIG. 3 is a cross-sectional view schematically showing the vertical vibrator according to the exemplary embodiment of the present invention.
Figure 4:
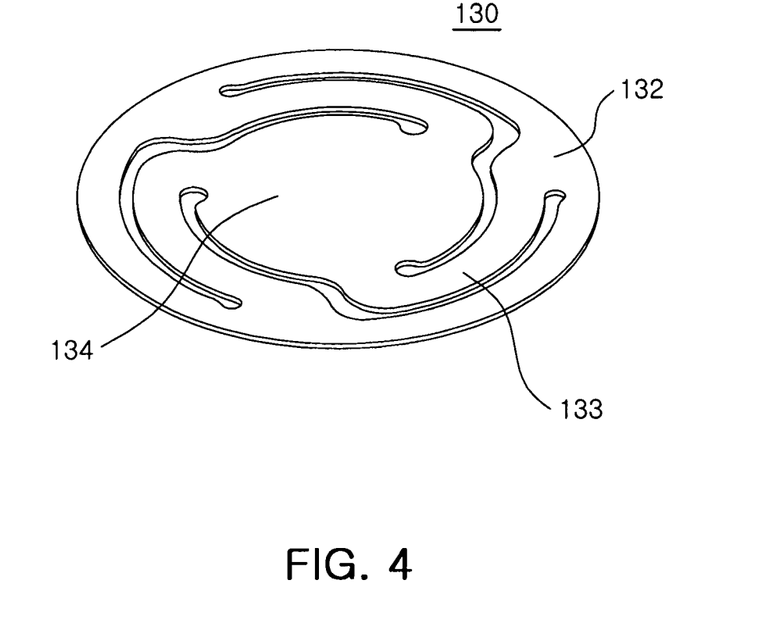
FIG. 4 is a perspective view schematically showing an elastic member of the vertical vibrator according to the exemplary embodiment of the present invention.

FIG. 1 is a perspective view schematically showing an appearance of a vertical vibrator according to an exemplary embodiment of the present invention, FIG. 2 is an exploded perspective view schematically showing the vertical vibrator according to the exemplary embodiment of the present invention, FIG. 3 is a cross-sectional view schematically showing the vertical vibrator according to the exemplary embodiment of the present invention, and FIG. 4 is a perspective view schematically showing an elastic member of the vertical vibrator according to the exemplary embodiment of the present invention.

Referring to FIGS. 1 to 4, a vertical vibrator 100 according to an exemplary embodiment of the present invention may include a casing 110, a magnetic unit 120, an elastic member 130, a vibrating unit 140, a coil 150 for generating vibrations, and a magnetic fluid 160.

The casing 110 is a receiving member having an inner space of a predetermined size and the lower portion of the casing 110 opened downward is closed by a bracket 114.

Further, the casing 110 includes a step portion 114 formed to be combined with the elastic member 130 to be described below, wherein the step portion 114 may be formed to be protruded so that the upper edge of the casing 110 is stepped.

The step portion 114 may be configured to include a horizontal portion 112 into which an outside ground portion 132 of the elastic member 130 is seated and a vertical portion 113 providing a vibration space for the elastic member 130, wherein the horizontal portion 112 may be formed by making the inner diameter of the upper portion of the casing 100 smaller than the inner diameter of the lower portion thereof based on the horizontal portion 112.

In the vertical vibrator 110 mainly generating vibrations in a vertical direction, the horizontal portion 112 prevents a mass body 144 from moving in a horizontal direction, thereby making it possible to obtain steady vibrational waveforms.

Further, the horizontal portion 112 and the vertical portion 113 can prevent touch tone and noises from being generated due to a direct contact with the casing 110 when the vibrating portion 140 is vibrated up and down.

The casing 110 is provided with at least one injecting hole 116 having a predetermined size to penetrate therethrough and the size of the injecting hole 116 is provided to have a size of an inner diameter smaller than that of an outer diameter of a magnet 141 to be described below so that a magnetic fluid 160 to be fixed by leakage flux is not positioned in the inner diameter of the injecting hole 116 but is positioned at the outer side thereof.

The magnetic unit 120 includes a yoke 142 and the magnet 141 disposed in the inner space of the casing 110 to generate a magnetic field having a predetermined strength and is formed in an approximate hollow cylindrical shape in which the upper portion of the yoke 142 is closed and the lower portion thereof is opened.

The upper and lower portions of the magnet 141 are magnetized to have different poles in a vertical direction and the magnet 141 is a cylindrical permanent magnet generating a magnetic force having a predetermined strength. The upper surface of the magnet 141 is bonded to the closed lower surface of the inner space of the yoke 142 by an adhesive so that the magnet 141 is fixedly disposed at the inner center of the yoke 142.

The inner surface of the yoke 142 and the outer surface of the magnet 141 have different sized inner and outer diameters so as to form air gaps AG having a predetermined size between the inner surface of the yoke 142 and the outer surface of the magnet 141 and the upper portions of coils 150 for generating vibrations are disposed between the air gaps AG.

Therefore, when the magnetic unit 120 configured to include the yoke 142 and the magnet 141 is vibrated up and down, the contact between the magnetic unit 120 and the coil 150 for generating vibrations is prevented by the air gap AG.

It is preferable that the lower surface of the magnet 141 is mounted with a lower plate 148 in order to smoothly form the magnetic flux, that is, the magnetic force flowing into the lower end of the yoke 142 via the coil 150 for generating vibrations at the opened side of the yoke 142.

The lower surface of the lower plate 148 should be positioned on approximately the same horizontal line as the lower surface of the vibrating unit 140 including the magnetic unit 120 and the mass body 144.

The lower portion of the lower plate 148 is provided with a rubber 180, wherein the rubber may be adhered to the upper surface of the bracket 114.

The rubber 180 absorbs the external impact and the impact generated when the vibrating unit 140 is vibrated up and down, thereby making it possible to extend the lifespan of the vertical vibrator 100.

The elastic member 130 may include an outside ground portion 132 fixed to the horizontal portion 112 of the casing 110 and an inside ground portion 134 fixed to the magnetic unit 120.

The elastic member 130 may be a plate spring that includes a plurality of elastic legs 133 having the outside ground portion 132 connected to one end thereof and extending in a spiral direction to generate an elastic force and the inside ground portion 134 connected to each of the other ends of the elastic legs 133 and fixed to the upper surface of the yoke 142 configuring the magnetic unit 120 or the upper surface of the mass body 144.

The vibrating unit 140 vibrated up and down by the elastic member 130 is provided with the hollow cylindrical mass body 144 that is integrally mounted on the outer surface of the yoke 142 configuring the magnetic unit 120 and the central portion of the mass body 144 may be provided with a central hole 145 having a predetermined size, wherein the central hole 145 penetrates through the central portion of the mass body 144 and is inserted with the body of the yoke 142.

The lower end of the inner surface of the central hole 145 may be provided with a protruding groove 147 having a projection 146 formed to be bent to the outer side of the lower end of the yoke 142 to prevent the lower of the mass body 144 from separating.

The projection 146 may be formed to be positioned higher than the lower surface of the mass body 144 and the projection 146 prevents the contact with an adhesive applied to the outer side of the lower end of the coil 150 for generating vibrations in order to fix the coil 150 for generating vibrations to the upper surface of the bracket 114 when the vibrator 140 falls maximally, thereby making it possible to stably secure the vertical vibration width of the vibration unit 140 if possible.

In addition, the mass body 144 may be provided to have the size of the outer diameter smaller than that of the inner diameter of the inner surface of the casing 110 so that it may be vibrated up and down without contacting the inner surface of the casing 110 when the mass body 144 is vibrated up and down.

Therefore, a gap having a predetermined size is formed between the inner surface of the casing 110 and the outer surface of the mass body 144.

It is preferable that the mass body 144 is made of a non-magnetic material that is not affected by the magnetic force generated from the magnet 141.

The lower end of the coil 150 for generating vibrations may be bonded to the upper surface of the bracket 114 closing the lower portion of the casing 110 by an adhesive, so that it is disposed just below the magnetic unit 120 to generate an electric field having a predetermined strength when power is applied from the outside.

The upper end of the coil 150 for generating vibrations is positioned in the air gap AG formed between the inner surface of the yoke 142 and the outer surface of the magnet 141 to smoothly perform the interaction between the magnetic field generated from the magnetic unit 120 and the electric field generated from the coil 150 for generating vibrations.

The upper surface of the bracket 114 may be provided with a printed circuit board 116 electrically connected to supply external power to the coil 150 for generating vibrations.

The magnetic fluid 160 is an impact absorbing member that maximally suppresses the direct contact between the fixing structure, the casing 110 and the movable structure, the vibrating unit 140 when the vibrating unit 140 including the magnetic unit 120 is vibrated up and down and is applied to the inside ground portion 134 of the elastic member 130 through the injecting hole 116 formed to penetrate through the upper surface of the casing 110 in order to absorb the touch noise and impact generated at the time of contacting.

The magnetic fluid 160 applied to the inside ground portion 134 may be disposed in an annular ring shape at a regular position corresponding to the upper outer edge of the magnet 141 by the magnetic flux leaked from the upper outer edge of the magnet 141 mounted on the closed lower surface of the yoke 142 and may be disposed at a regular position by the magnetic flux leaked from the magnet 141 to absorb the touch noise and impact generated at the time of contacting between other members generated during the change in the vertical vibration of the vibrator 140.

That is, the magnetic fluid 160 contacts the upper inner surface of the casing 110 while the vibrator 140 instantly rises to the maximum height or more if the resonance frequency applied to the vibrator 140 is applied at a level higher than the preset frequency while the vibrator 140 is vibrated up and down in the inner space of the casing 110, but the magnetic fluid 160 first contacts the upper inner surface of the casing 110 to previously prevent the direct impact, thereby making it possible to absorb the impact and touch noises generated at the time of contact.

Further, it is preferable that the outer diameter of the magnet 141 is provided to be larger than the size of the inner diameter of the injecting hole 116 so that the magnetic fluid 160 regularly positioned on the inside ground portion 134 of the elastic member 130 in the annular ring shape is not positioned in the range of the inner diameter of the injecting hole 116 by the magnetic flux leaked from the outer edge of the magnet 141.

Therefore, the magnetic fluid 160 vertically corresponds to the lower surface of the casing 110 through which the injecting hole 116 does not penetrate.

In this case, the injecting hole 116 can be safely closed by a tape member 115 of which the surface is printed with a label and attached to the upper surface of the casing 110 so as not to expose the magnetic fluid 160 to the outside.

The magnetic fluid 160 is a fluid having both ferromagnetic metal properties and the fluidity of fluid. This fluid is formed by stabilizing and dispersing magnetic powders within a liquid in a colloidal shape and then adding a surfactant so as not to generate the precipitation or aggregation of magnetic powders due to gravity or a magnetic field. The fluid has Brownian motion inherent in ultrafine particles and constantly maintains the concentration of magnetic powder particles in the fluid even when an external magnetic field, gravity, centrifugal force, or the like, are applied to the fluid.

The magnetic fluid 160 is fixed by being applied to the inside ground portion 134 of the elastic member 130, thereby making it possible to reinforce the force of fixing the magnetic fluid 160 to the magnet 141.

Figure 5:
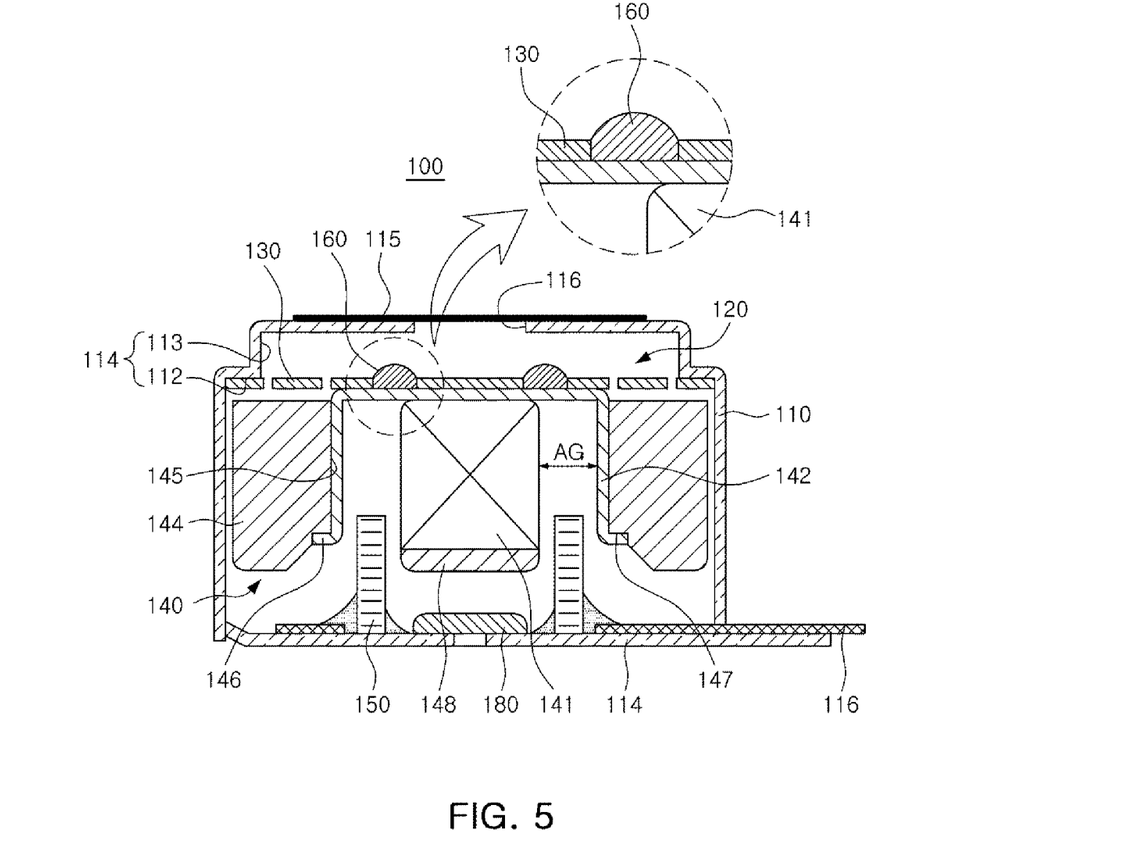
FIG. 5 is a cross-sectional view schematically showing a vertical vibrator according to another exemplary embodiment of the present invention.
Figure 6:
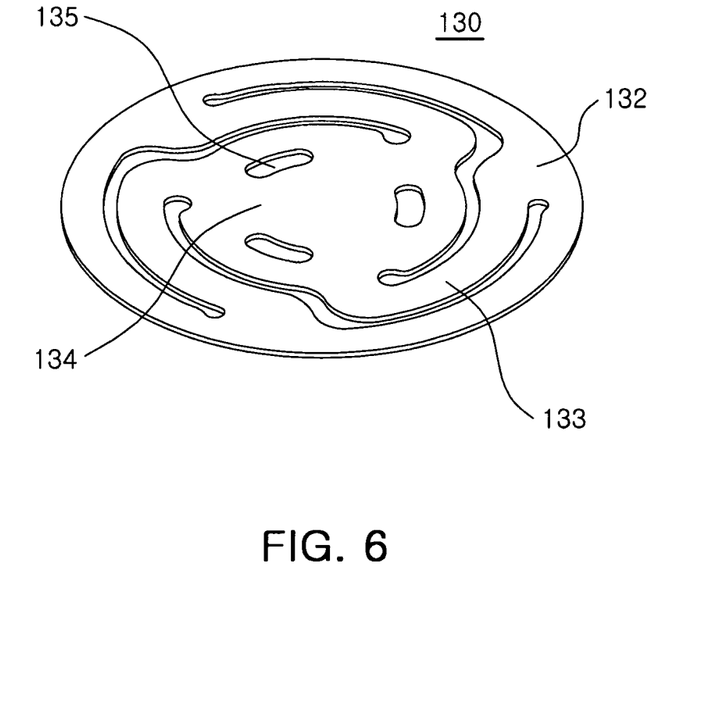
FIG. 6 is a perspective view schematically showing an elastic member of the vertical vibrator according to another exemplary embodiment of the present invention.

FIG. 5 is a cross-sectional view schematically showing a vertical vibrator according to another exemplary embodiment of the present invention and FIG. 6 is a perspective view schematically showing an elastic member of the vertical vibrator according to another exemplary embodiment of the present invention.

Referring to FIGS. 5 and 6, the vertical vibrator 100 according to another exemplary embodiment of the present invention may include the casing 110, the magnetic unit 120, the elastic member 130, the vibrating unit 140, the coil 150 for generating vibrator, and the magnetic fluid 160.

All the components other than the elastic member 130 are the same as those in FIGS. 1 to 4 and therefore, the detailed description thereof will be omitted.

The inside ground portion 134 of the elastic member 130 may include a fluid insertion hole 135 formed in order to apply and insert the magnetic fluid 160.

The magnetic fluid 160 applied to the fluid insertion hole 135 may be disposed in an annular ring shape at a regular position corresponding to the upper outer edge of the magnet 141 by the magnetic flux leaked from the upper outer edge of the magnet 141 mounted on the closed lower surface of the yoke 142 and may be disposed at a regular position by the magnetic flux leaked from the magnet 141 to absorb the touch noise and impact generated at the time of contacting between other members generated during the change in the vertical vibration of the vibrator 140.

The magnetic fluid 160 may be fixed by being applied to the fluid insertion hole 135 and the magnetic fluid 160 may contact the surface of the yoke 142 through the fluid insertion hole 135, thereby making it possible to reinforce the cohesive power of the magnetic fluid 160 by reducing the distance between the magnet 141 and the magnetic fluid 160.

That is, when the cohesive power of the magnetic fluid 160 is strong, the magnetic fluid is returned to an initial position when the motor stops, thereby making it possible to prevent the touch tone and noises from being generated when the vibrating unit 140 is vibrated up and down and obtain the steady vibrational waveforms.

Figure 7:
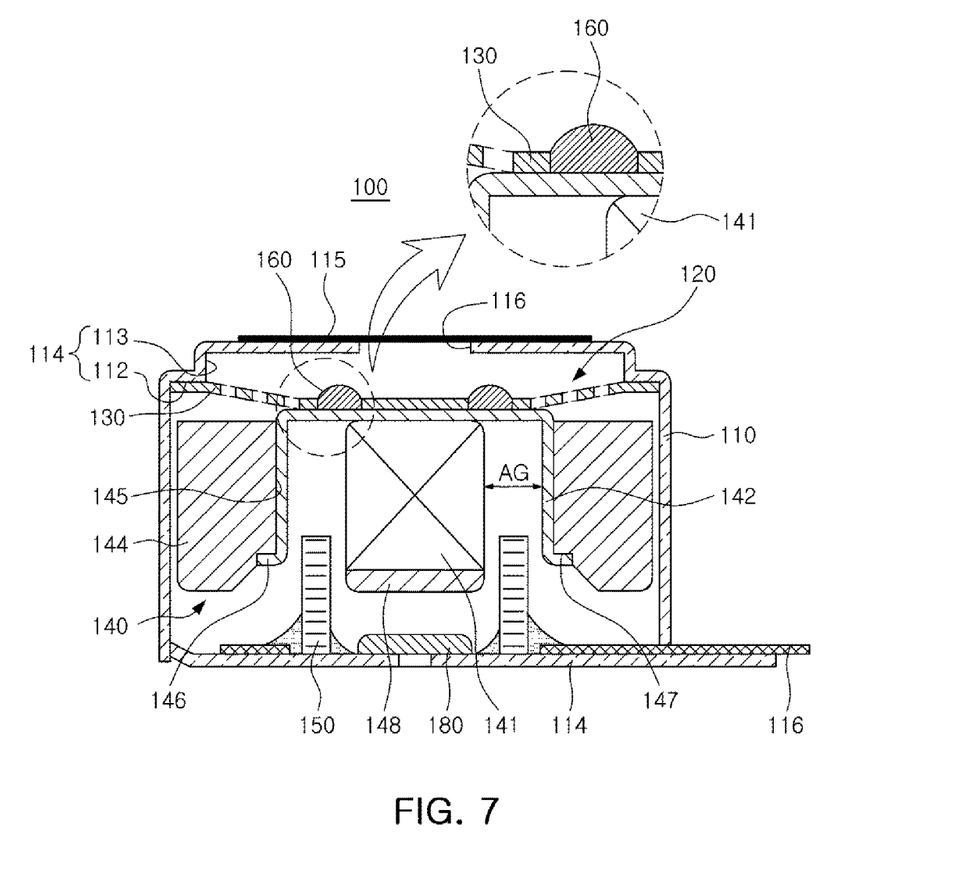
FIG. 7 is a cross-sectional view schematically showing a vertical vibrator according to another exemplary embodiment of the present invention.
Figure 8:
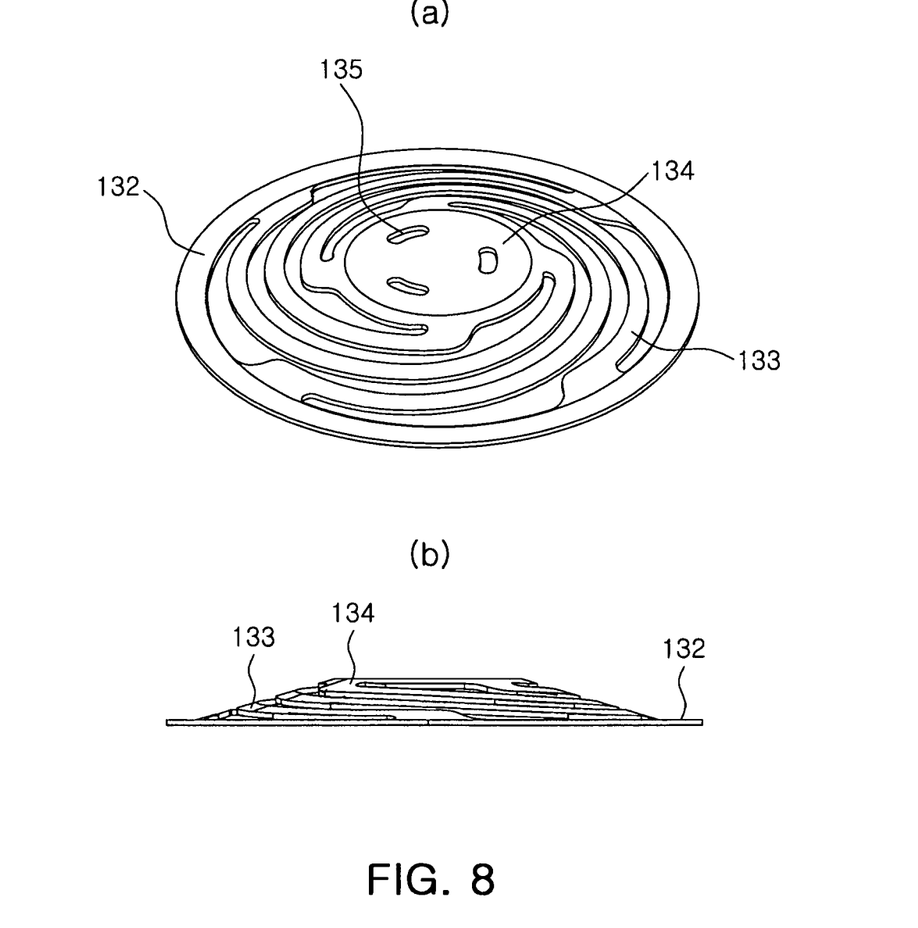
FIG. 8 is a perspective view schematically showing an elastic member of the vertical vibrator according to another exemplary embodiment of the present invention.

FIG. 7 is a cross-sectional view schematically showing a vertical vibrator according to another exemplary embodiment of the present invention and FIG. 8 is a perspective view schematically showing an elastic member of the vertical vibrator according to another exemplary embodiment of the present invention.

Referring to FIGS. 7 and 8, the elastic member 130 of the vertical vibrator 100 according to another exemplary embodiment of the present invention may be a bending spring.

The bending spring 130 may include the plurality of elastic legs 133 having the outside ground portion 132 connected to one end thereof and extending in a spiral direction to generate an elastic force and the inside ground portion 134 connected to each of the other ends of the elastic legs 133 and fixed to the upper surface of the yoke 142 configuring the magnetic unit 120 and the upper surface of the mass body 144.

Further, similar to the plate spring, the inside ground portion 134 of the bending spring 130 may be formed with the fluid insertion hole 135 and the fluid insertion hole 135 has the functions and effects as described above.

As set forth above, the linear vibration motor according to the present invention can prevent the horizontal motion of the mass body when the motor is driven and reinforce the cohesive power of the magnetic fluid to return the magnetic fluid to an initial position when the motor stops, thereby making it possible to prevent the touch tone and noises from generating when the vibrating unit is vibrated up and down and obtain the steady vibration waveforms by allowing the magnetic fluid to absorb the impact.

While the present invention has been shown and described in connection with the exemplary embodiments, it will be apparent to those skilled in the art that modifications and variations can be made without departing from the spirit and scope of the invention as defined by the appended claims.

What is claimed is:

1. A vertical vibrator, comprising:
   a casing having an inner space of a predetermined size formed therein and a step portion protruded to be stepped from an upper edge thereof;
   a magnetic unit including a yoke disposed in the inner space of the casing and a magnet fixed by being magnetized on an closed inner surface of the yoke in a vertical direction;
   an elastic member including an outside ground portion fixed to the step portion and an inside ground portion fixed to the magnetic unit, the inside ground portion having at least one fluid insertion hole provided in a position corresponding to an upper outer edge of the magnet;
   a coil for generating vibrations disposed on a lower portion of the magnetic unit and generating electromagnetic force by interaction with the magnetic unit when power is applied; and
   a magnetic fluid applied to the inside ground portion to be fixed by magnetic flux leaked from the magnet.

2. The vertical vibrator of claim 1, wherein the step portion includes a horizontal portion seated in the outside ground portion and a vertical portion providing a vibration space for the elastic member.

3. The vertical vibrator of claim 2, wherein the horizontal portion is formed by making the inner diameter of the upper portion of the casing smaller than the inner diameter of the lower portion thereof based on the horizontal portion.

4. The vertical vibrator of claim 1, wherein the magnetic fluid is inserted into the fluid insertion hole by being applied thereto.

5. The vertical vibrator of claim 1, wherein the casing is formed with at least one injecting hole to penetrate therethrough in order to inject the magnetic fluid.

6. The vertical vibrator of claim 5, wherein the injecting hole has a size of an inner diameter smaller than an outer diameter of the magnet.

7. The vertical vibrator of claim 1, wherein the elastic member is a plate spring or a bending spring including at least one elastic leg connected to the outer ground portion and the inner ground portion to generate an elastic force.

8. The vertical vibrator of claim 7, wherein the elastic leg extends in a spiral direction.

* * * * *